(12) United States Patent
Kim et al.

(10) Patent No.: US 7,624,358 B2
(45) Date of Patent: Nov. 24, 2009

(54) MOUSE RADAR FOR ENHANCED NAVIGATION OF A TOPOLOGY

(75) Inventors: Steven P. Kim, Raleigh, NC (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 11/113,798

(22) Filed: Apr. 25, 2005

(65) Prior Publication Data

US 2006/0242605 A1 Oct. 26, 2006

(51) Int. Cl.
  *G06F 3/048* (2006.01)
  *G01C 21/00* (2006.01)
  *G01C 21/30* (2006.01)
(52) U.S. Cl. .................. 715/855; 715/854; 715/856; 715/857; 715/861; 715/802; 715/858; 715/859; 701/202; 701/209; 701/211; 701/207; 701/208
(58) Field of Classification Search .............. 715/816, 715/737, 862, 857, 759; 701/202, 209, 211, 701/207, 208
See application file for complete search history.

(56) References Cited

U.S. PATENT DOCUMENTS

| | | | |
|---|---|---|---|
| 4,677,561 A | 6/1987 | Akama et al. | |
| 4,847,605 A | 7/1989 | Callahan et al. | |
| 4,987,411 A | 1/1991 | Ishigami | |
| 5,452,212 A * | 9/1995 | Yokoyama et al. | 701/211 |
| 5,508,717 A * | 4/1996 | Miller | 715/858 |
| 5,510,811 A | 4/1996 | Tobey et al. | |
| 5,565,888 A | 10/1996 | Selker | |
| 5,638,279 A | 6/1997 | Kishi et al. | |
| 5,754,430 A * | 5/1998 | Sawada | 701/209 |
| 5,808,601 A | 9/1998 | Leah et al. | |
| 5,808,604 A | 9/1998 | Robin | |
| 5,874,905 A * | 2/1999 | Nanba et al. | 340/995.2 |
| 6,046,722 A | 4/2000 | McKiel, Jr. | |
| 6,075,531 A | 6/2000 | DeStefano | |
| 6,121,900 A * | 9/2000 | Takishita | 340/995.11 |
| 6,178,380 B1 * | 1/2001 | Millington | 701/212 |
| 6,234,106 B1 | 5/2001 | Dohnal et al. | |
| 6,259,432 B1 * | 7/2001 | Yamada et al. | 345/159 |

(Continued)

FOREIGN PATENT DOCUMENTS

EP     0170725 A1    2/1986

(Continued)

OTHER PUBLICATIONS

2004 Lexus Navigation system—Owner' Manual—RX 330 Copyright 2004 Toyota Moto Corporation Publication No. OM48493U.*

(Continued)

*Primary Examiner*—Dennis-Doon Chow
*Assistant Examiner*—Linh K Pham
(74) *Attorney, Agent, or Firm*—Hoffman Warnick LLC

(57) ABSTRACT

A system and method for enhancing navigation of a topology within a visual display. A system is disclosed including: a system for displaying an enhanced mouse pointer in a current view, wherein the enhanced mouse pointer includes an indicator that points to a resource outside the current view; and a processing system for calculating the indicator by analyzing resources in the topology.

15 Claims, 3 Drawing Sheets

U.S. PATENT DOCUMENTS

| | | |
|---|---|---|
| 6,518,987 B1 | 2/2003 | Crevasse et al. |
| 6,597,383 B1 * | 7/2003 | Saito .......................... 715/860 |
| 6,611,753 B1 * | 8/2003 | Millington .................. 701/209 |
| 6,670,910 B2 | 12/2003 | Delcheccolo et al. |
| 6,677,965 B1 * | 1/2004 | Ullmann et al. ............. 715/786 |
| 6,717,600 B2 | 4/2004 | Dutta et al. |
| 6,771,189 B2 * | 8/2004 | Yokota ....................... 340/990 |
| 6,801,231 B1 | 10/2004 | Beltz |
| 6,873,905 B2 * | 3/2005 | Endo et al. .................. 701/202 |
| 7,071,919 B2 | 7/2006 | Hinckley et al. |
| 7,100,123 B1 | 8/2006 | Todd et al. |
| 2001/0030668 A1 | 10/2001 | Erten et al. |
| 2001/0034238 A1 | 10/2001 | Voyer |
| 2003/0018427 A1 * | 1/2003 | Yokota et al. ............... 701/208 |
| 2005/0091604 A1 * | 4/2005 | Davis ......................... 715/772 |
| 2005/0183031 A1 * | 8/2005 | Onslow ....................... 715/805 |

FOREIGN PATENT DOCUMENTS

| | | |
|---|---|---|
| EP | 0684451 A1 | 11/1995 |
| EP | 1273885 A2 | 1/2003 |
| JP | 05-298023 | 11/1993 |
| JP | 2003-123200 A | 4/2003 |
| JP | 2003-312415 | 6/2003 |
| WO | WO2004/083767 A2 | 3/2004 |

OTHER PUBLICATIONS

Toyota Motor Corporation, "Lexxus Navigation System—Owner's Manual—RX330", Publication No. OM48493U, Copyright 2004, 33 pages.

IBM Technical Disclosure Bulletin, vol. 35, No. 6, "Methodology for Marking Objects Using a Polar Coordinate Point and Shoot Cursor", pp. 310-311, Nov. 1992.

USPTO Office Action, Mail Date Dec. 28, 2007, U.S. Appl. No. 11/059,722, filed Feb. 16, 2005.

USPTO Final Office Action, Notification Date Aug. 7, 2008, U.S. Appl. No. 11/059,722, filed Feb. 16, 2005.

USPTO Office Action, Notification Date Mar. 6, 2009, U.S. Appl. No. 11/059,722, filed Feb. 16, 2005.

* cited by examiner

MOUSE RADAR FOR ENHANCED NAVIGATION OF A TOPOLOGY

BACKGROUND OF THE INVENTION

1. Technical Field

The present invention relates generally to navigating visual data, and more specifically relates to a system and method for providing an enhanced mouse pointer for navigating a topology.

2. Related Art

The ability to graphically visualize and navigate vast amounts of data (referred to herein as a "topology") on a computer display has become an indispensable tool in many different applications. Common applications involve 2D/3D topological displays, treemap displays, hyperbolic tree displays, physical maps (e.g., such as that provided by MAPQUEST® and GPS map displays), etc. Most current applications that provide data visualization offer various features to help with navigation. Such features include the ability to zoom in and out, to pan around the information being visualized, etc.

One of the challenges with navigating data within these applications is that it can be difficult for a user to maintain his or her bearings. Namely, as the user pans from one location to another and zooms in and out, it can become challenging to fully comprehend the data being visualized. This is especially true when the user is traversing a path or series of paths within a topological view or a map. Also, when a user has arrived at a specific location within a topology, the user is forced to re-establish context by either panning in a direction from the current view or zooming-out of the current view to determine the next location to traverse to.

Current applications provide no indication or visual marker for the user to follow as a guide to help determine the next possible location that might be of interest to the user. In addition, when maneuvering across a topology for a specific purpose, the user is not presented with any visual context or indication of how far or close the next destination is within a specified range. Accordingly, a need exists for an improved system and method for navigating topologies.

SUMMARY OF THE INVENTION

The present invention addresses the above-mentioned problems, as well as others, by providing an enhanced mouse pointer for use in navigating topologies a graphical visualization display system. The enhanced mouse pointer essentially provides a radar utility that allows the user to identify resources beyond the current view based on a set of criteria defined for the user. Thus, the user is able to navigate more efficiently from within the context of the current view.

In a first aspect, the invention provides a system for enhancing navigation of a topology within a visual display, comprising: a system for displaying an enhanced mouse pointer in a current view, wherein the enhanced mouse pointer includes an indicator that points to a resource outside the current view; and a processing system for calculating the indicator by analyzing resources in the topology.

In a second aspect, the invention provides a program product stored on a computer readable medium for enhancing navigation of a topology in a visual display, wherein the program product comprises: program code configured for displaying an enhanced mouse pointer in a current view, wherein the enhanced mouse pointer includes an indicator that points to a resource outside the current view; and a program code configured for calculating the indicator by analyzing resources in the topology.

In a third aspect, the invention provides a method for enhancing navigation of a topology in a visual display, wherein the method comprises: positioning a mouse pointer in a current view of the topology; calculating an indicator by analyzing resources in the topology; and displaying the indicator proximate the mouse pointer, wherein the indicator points to a resource of interest outside the current view.

In a fourth aspect, the invention provides a method for deploying a topology navigation system, comprising: providing a computer infrastructure being operable to: position a mouse pointer in a current view of the topology; calculate an indicator by analyzing resources in the topology; and display the indicator proximate the mouse pointer, wherein the indicator points to a resource of interest outside the current view.

In a fifth aspect, the invention provides computer software for implementing a topology navigation system, the computer software comprising instructions to cause a computer to perform the following functions: position a mouse pointer in a current view of the topology; calculate an indicator by analyzing resources in the topology; and display the indicator proximate the mouse pointer, wherein the indicator points to a resource of interest outside the current view.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

The present invention provides an enhanced mouse pointer that essentially provides a radar utility for navigating a visual topology of data (i.e., "topology") presented on a computer generated display. Such a topology may be provided by any application allowing visualization and navigation of data on a two dimensional (2D) display. Thus, while the present invention is described with reference to applications that display 2D physical maps such as that provide by MAPQUEST®, it should be understood that the invention is not limited to physical maps.

As noted above, one of the challenges of navigating data within a 2D display is that as the user moves from view to view within the topology, the user can easily lose his or her bearings. Consider the case of a 2D display depicting thousands of interconnected resources (e.g., highways, cities, museums, etc.). Each resource has characteristics that are visualized to the user, such as status, priority, type, recent update flat, etc. Given the density of the view, a user may pan around and/or zoom in several times in order to have the necessary detail presented about a resource of interest. Instead of randomly panning to locate a desired resource, the present invention provides an enhanced mouse pointer, which helps to determine the next logical location or direction that a user should traverse to locate a resource.

As is described in further detail below, the enhanced mouse pointer essentially provides a mouse radar implemented as a circular band placed around the outer perimeter of the pointer. Indicators, such as colored dots, are placed along the circular band to indicate the direction and relevant distance of "interesting" resources that are beyond the current view being displayed to the user. The indicators therefore help the user determine the direction and distance to traverse from within the current view to see a resource beyond the current view.

Criteria for determining what are the resources of interest, and therefore what shows up on the mouse radar can be defined for the user in any manner (e.g., interactively, via a persistent user preference, a system setting, etc.). Thus, for example, a user may designate certain resources as high priority, and request that the mouse radar always include indicators that point to the high priority resources.

Figure 1:
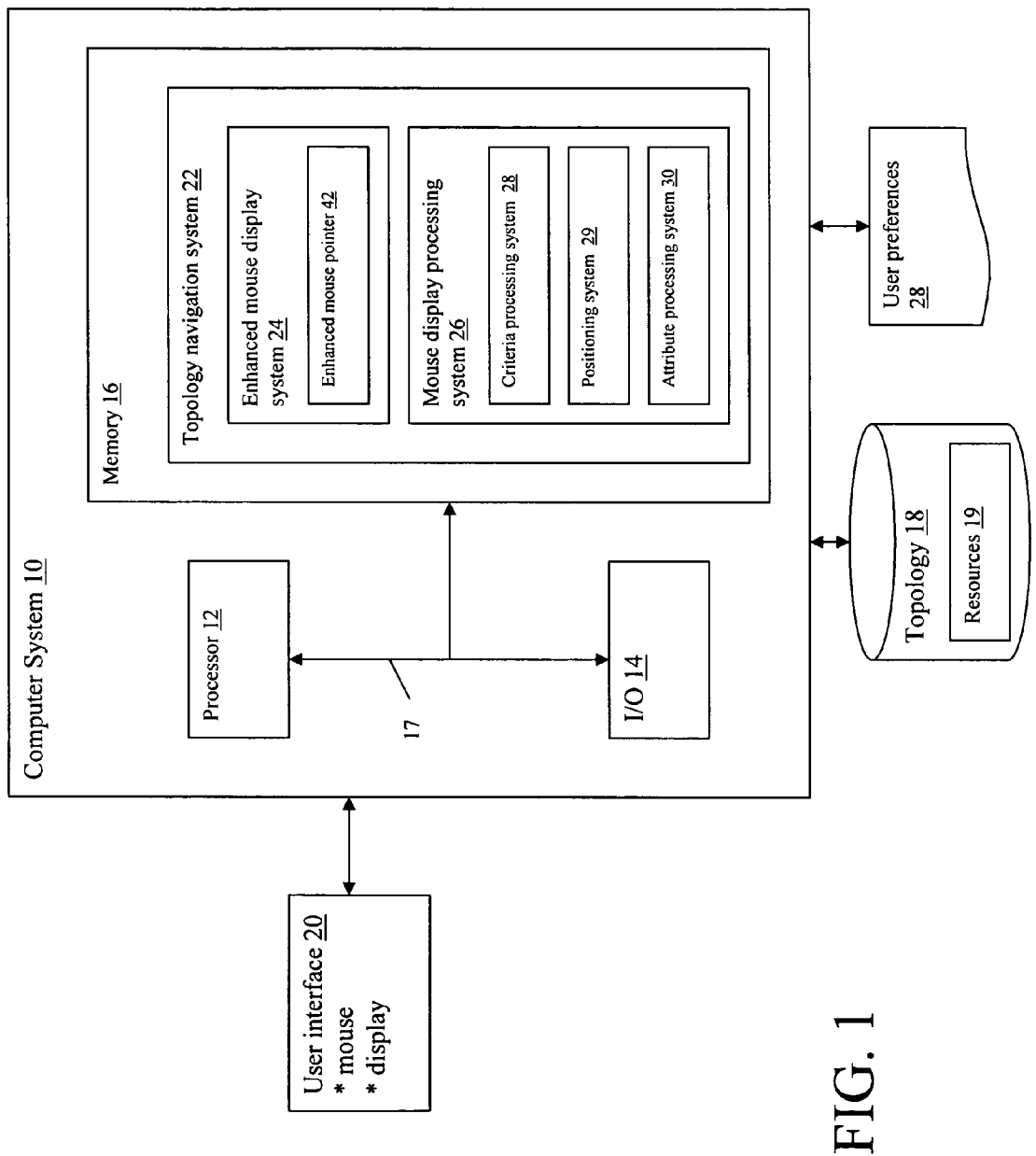
FIG. 1 depicts a computer system having a topology navigation system in accordance with the present invention.

Referring now to FIG. 1, a computer system 10 is shown having a topology navigation system 22 capable of graphically displaying a topology 18 to a user via a user interface 20. User interface 20 generally comprises a computer generated display (e.g., an LCD display, a GPS display, a cell phone display, a PDA display, etc.) for displaying a view of the topology 18 to the user, and a mouse or other pointing devices for allowing the user to navigate the topology 18. It should be understood that for the purposes of this disclosure, the term "mouse" includes any interactive pointing device, such as that provided by a touch pad, keyboard input, touch screen, etc.

In general, computer system 10 may comprise, e.g., a desktop, a laptop, a workstation, handheld device, mobile device, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage including random access memory (RAM), read-only memory (ROM), a data cache, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Topology navigation system 22 includes: (1) an enhanced mouse display system 24 for displaying an enhanced mouse pointer 42, and (2) a mouse display processing system 26 for calculating indicators to include with the enhanced mouse pointer 42. As is described in further detail below with reference to FIG. 2, the enhanced mouse pointer 42 includes a set of indicators (i.e., zero or more) that reside along a circular band and point to resources that exist beyond the current view of the topology 18 being displayed. Mouse display processing system 26 calculates the set of indicators using a criteria processing system 28, a positioning system 29, and an attribute processing system 30. In general, the set of indicators are continuously recalculated and updated, e.g., to reflect movement of the mouse, preference changes inputted by the user, changes to the underlying data, etc.

Criteria processing system 28 determines which resources from among the entire set of resources 19 provided by the topology 18 are to be designated as "of interest" to the user. As noted above, this may be done in any manner. In one illustrative embodiment, criteria processing system 28 cross references predefined user preferences 28 with the topology resources 19 found in the topology 20. For example, in a map application, the user preferences 28 may indicate that the user has an interest in museums. Criteria processing system 28 will then identify any topology resources 19 that involve museums. Each such identified resource is then a candidate to be associated and linked to an indicator that will appear within the enhanced mouse pointer 42.

Once the resources of interest to the user are identified, positioning system 29 dynamically calculates the position of the associated indicators within the enhanced mouse pointer 42. The position of each indicator is based on the location of the associated resource relative to the mouse pointer. For instance, in a map application, if a resource of interest is located northeast of the mouse pointer, the indicator for that resource may appear within the northeast (i.e., upper right) portion of the circular band.

In a further refinement, the circular band of the enhanced mouse pointer 42 may have a depth defined by an inner and outer perimeter. Depending on the distance to the resource, positioning system 29 will locate the indicator at a relative distance between the inner or outer perimeter. Thus, the positioning of the indicator relative to the inner and outer perimeters of the band conveys a distance to the resource. For instance, indicators closer to the inner perimeter represent resources just outside the current view. Indicators closer to the outer perimeter represent resources that are farther away, e.g., at an outer limit of the topology. In a map display, the position within the circular band may represent a distance in miles, where the distance is set based on the zoom level.

Attribute processing system 30 determines a visual (or audio) form each indicator is to take in order to convey some information about the resource being pointed to. To achieve this, each indicator may include one or more attributes. Attributes may for example include shape, color, size, blinking, beeps, etc., such that different attributes convey different information. For instance, in a map application, a dot may indicate a city, with larger cities being conveyed by larger sized dots. Color may be used to indicate some additional information, e.g., blue dots may indicate cities that reside near water. Other shapes, such as icons could likewise be used to connote specific properties of the resource. Moreover, attributes may be used to connote a relevant importance to the end user, e.g., red attributes are of high priority, yellow are of medium priority, and green are of low priority. It should be understood that any type of attribute may be given to an indicator to connote any type of information about an associated resource.

Figure 2:
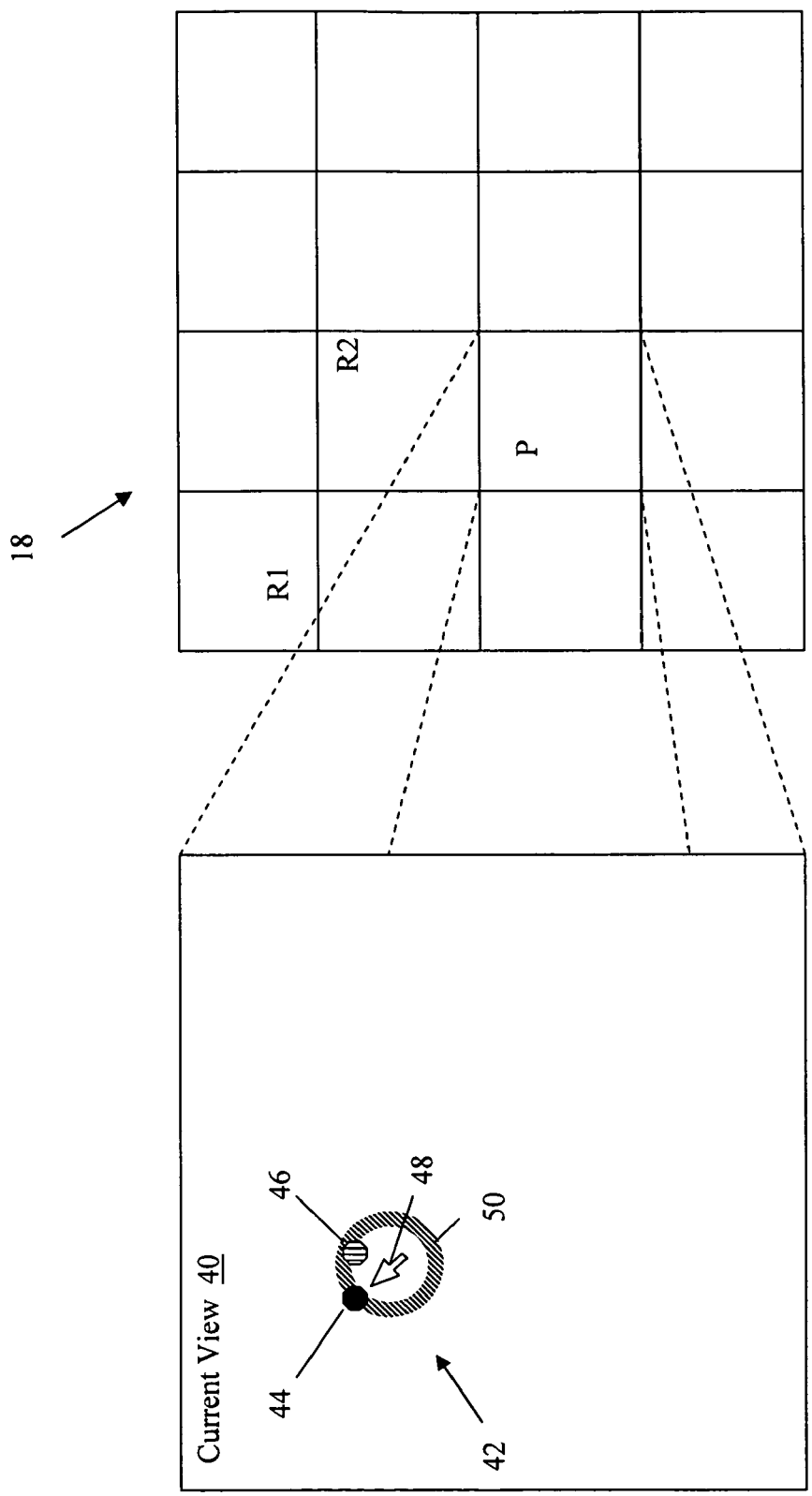
FIG. 2 depicts an exploded view of a topology with an enhanced mouse pointer.

Referring now to FIG. 2, an illustrative example of an enhanced mouse pointer 42 is shown in an exploded view. On the right hand side of the diagram is a topology grid, e.g., representing the complete data boundaries of a data topology 18. As can be seen, the topology 18 shows two resources of interest, R1 and R2, as well as the position of the mouse pointer P. On the left hand side is a current view 40 of one of the grids of the topology 18, i.e., the current view 40 is what the user zoomed in on and sees in their display.

Depicted in the current view 40 is an illustrative enhanced mouse pointer 42, which includes a pointer 48, a circular band 50, and two indicators 44 and 46. Indicator 44 is given the attribute of a solid dot and is located on an outer portion of the circular band 50, while resource 46 is given the attribute of vertical lines and is located on an inner portion of the circular band 50. As discussed above, the position of the indicators 44, 46 along the circular band 50 indicates the direction and relative distance to the resources of interest, R1 and R2, in the topology 18. For instance, to navigate to the resource R1 indicated by indicator 44, the user would pan up and to the left. To navigate to the resource R2 indicated by indicator 46, the user would pan up and to the right. Moreover, it can be seen from the enhanced mouse pointer 42 that resource R2 is relatively closer than resource R1.

It should be understood that the indicators 44, 46 will move interactively as the pointer 48 is panned around the current view 40. Moreover, any updates to the underlying data in the topology 18 will also be updated on the mouse radar. For example, a resource that changed from unsatisfactory to satisfactory might disappear off of the mouse radar.

Additionally, it should be understood that the configuration and appearance of the enhanced mouse pointer 42 can vary without departing from the scope of the invention. For instance, circular band 50 may be non-circular, be implemented as a single line, be implemented as more than two circles, etc. Furthermore, pointer 48 need not be an arrow.

Figure 3:
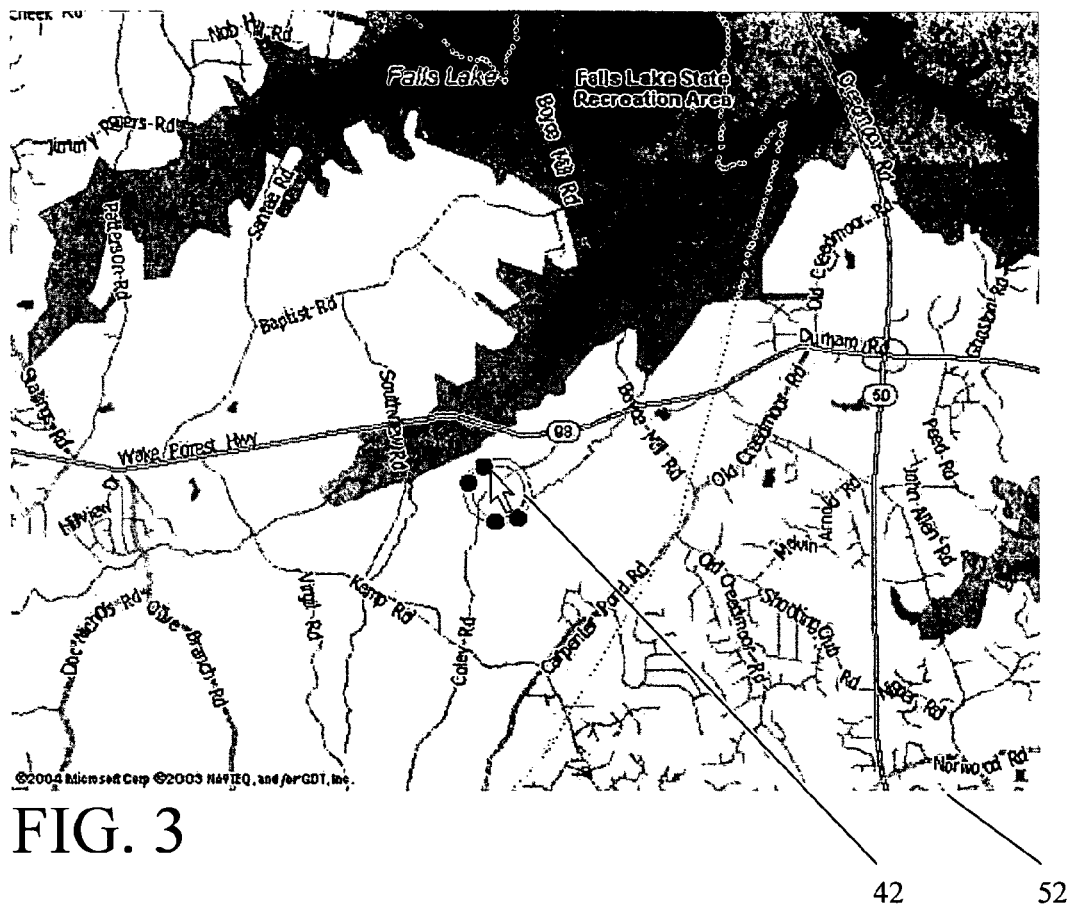
FIG. 3 depicts a physical map having an enhanced mouse pointer.
Figure 4:
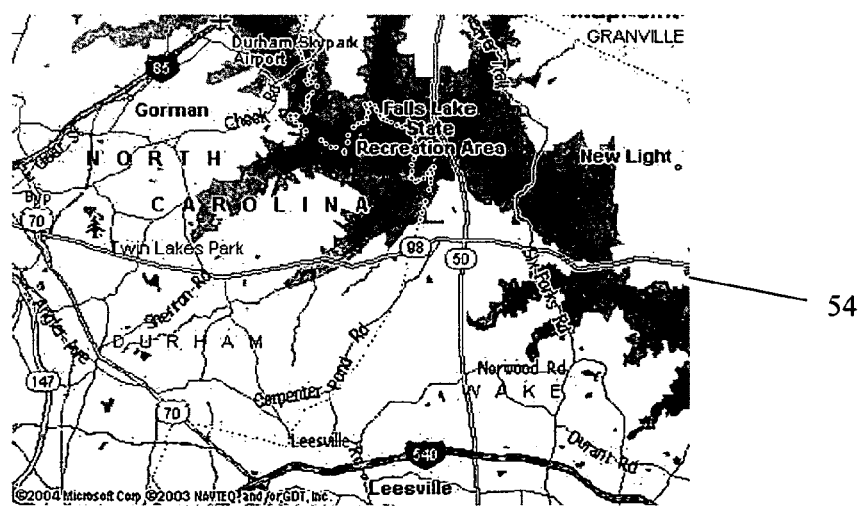
FIG. 4 depicts a zoomed out version of the physical map of FIG. 3.

FIG. 3 depicts an example of an enhanced mouse pointer 42 used on a physical map 52. In this case, indicators include dots, as well as small rectangular boxes to point to resources outside the view shown in FIG. 3. FIG. 4 shows a zoomed out view 54 of the map shown in FIG. 3.

Although not shown, topology navigation system 22 may include various user controls. For instance, the various features discussed herein may be turned on and off by the user. Furthermore, the user may be able to interactively input, update and change preferences to locate new or different resources.

It should also be appreciated that the teachings of the present invention could be offered as a business method on a subscription or fee basis. For example, a computer system 10 comprising topology navigation system 22 could be created, maintained and/or deployed by a service provider that offers the functions described herein for customers. That is, a service provider could offer to provide topology navigation services as described above.

It is also understood that the systems, functions, mechanisms, methods, engines and modules described herein can be implemented in hardware or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for enhancing navigation of a topology within a visual display, comprising:
    a device for displaying an enhanced mouse pointer in a current view, wherein the enhanced mouse pointer includes an indicator that directionally points to a resource in the topology outside the current view, wherein the enhanced mouse pointer includes a circular band surrounding the enhanced mouse pointer, wherein the indicator is located along the circular band, wherein the circular band includes an inner perimeter and an outer perimeter and wherein a position of the indicator relative to the inner and outer perimeters provides a relative distance to the resource, and wherein the enhanced mouse pointer is continuously movable within the current view by a user operating a mouse; and
    a processing system for calculating the indicator by analyzing resources in the topology.

2. The system of claim 1, wherein the indicator includes an attribute that provides information about the resource.

3. The system of claim 2, wherein the attribute is selected from the group consisting of: a color, a shape, and a size.

4. The system of claim 1, wherein the processing system identifies resources of interest for a user based on a set of user preferences.

5. The system of claim 4, wherein the enhanced mouse pointer includes a separate indicator for each of the identified resources of interest.

6. A computer readable medium having a program product stored thereon for enhancing navigation of a topology in a visual display, the computer readable medium comprising program code for performing the following steps when executed on a computer system:
    displaying an enhanced mouse pointer in a current view, wherein the enhanced mouse pointer includes an indicator that directionally points to a resource in the topology outside the current view, wherein the enhanced mouse pointer includes a circular band surrounding the enhanced mouse pointer, wherein the circular band includes an inner perimeter and an outer perimeter and wherein a position of the indicator relative to the inner and outer perimeters provides a relative distance to the resource, and wherein the indicator is located along the circular band; and calculating the indicator by analyzing resources in the topology.

7. The computer readable medium of claim 6, wherein the indicator includes an attribute that provides information about the resource.

8. The computer readable medium of claim 7, wherein the attribute is selected from the group consisting of: a color, a shape, and a size.

9. The computer readable medium of claim 6, wherein the processing system identifies resources of interest for a user based on a set of user preferences.

10. The computer readable medium of claim 9, wherein the enhanced mouse pointer includes a separate indicator for each of the identified resources of interest.

11. A method for enhancing navigation of a topology in a visual display, wherein the method comprises:

positioning a mouse pointer in a current view of the topology, wherein the mouse pointer includes a circular band surrounding the mouse pointer, and wherein the circular band includes an inner perimeter and an outer perimeter and wherein a position of the indicator relative to the inner and outer perimeters provides a relative distance to the resource;

calculating an indicator by analyzing resources in the topology; and displaying the indicator proximate the mouse pointer, wherein the indicator directionally points to a resource of interest in the topology outside the current view, and wherein the indicator is located along the circular band.

12. The method of claim 11, wherein the indicator includes an attribute that provides information about the resource of interest.

13. The method of claim 12, wherein the attribute is selected from the group consisting of: a color, a shape, and a size.

14. The method of claim 11, wherein the step of calculating the indicator includes:

identifying at least one resource of interest determining a position of the at least one resource of interest; and determining attributes for the at least one resource of interest.

15. A method for deploying a topology navigation system, comprising providing a computer infrastructure being operable to position a mouse pointer in a current view of the topology, wherein the mouse pointer includes a circular band surrounding the mouse pointer, and wherein the circular band includes an inner perimeter and an outer perimeter and wherein a position of the indicator relative to the inner and outer perimeters provides a relative distance to the resource;

calculate an indicator by analyzing resources in the topology; and display the indicator proximate the mouse pointer, wherein the indicator directionally points to a resource of interest in the topology outside the current view, and wherein the indicator is located along the circular band.

* * * * *

UNITED STATES PATENT AND TRADEMARK OFFICE
CERTIFICATE OF CORRECTION

| | | |
|---|---|---|
| PATENT NO. | : 7,624,358 B2 | Page 1 of 1 |
| APPLICATION NO. | : 11/113798 | |
| DATED | : November 24, 2009 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this

Twenty-sixth Day of October, 2010

David J. Kappos
*Director of the United States Patent and Trademark Office*